June 5, 1956  A. B. SKROMME ET AL  2,748,535
TRASH MULCH SEED BED MACHINE
Filed Oct. 25, 1951  8 Sheets-Sheet 1
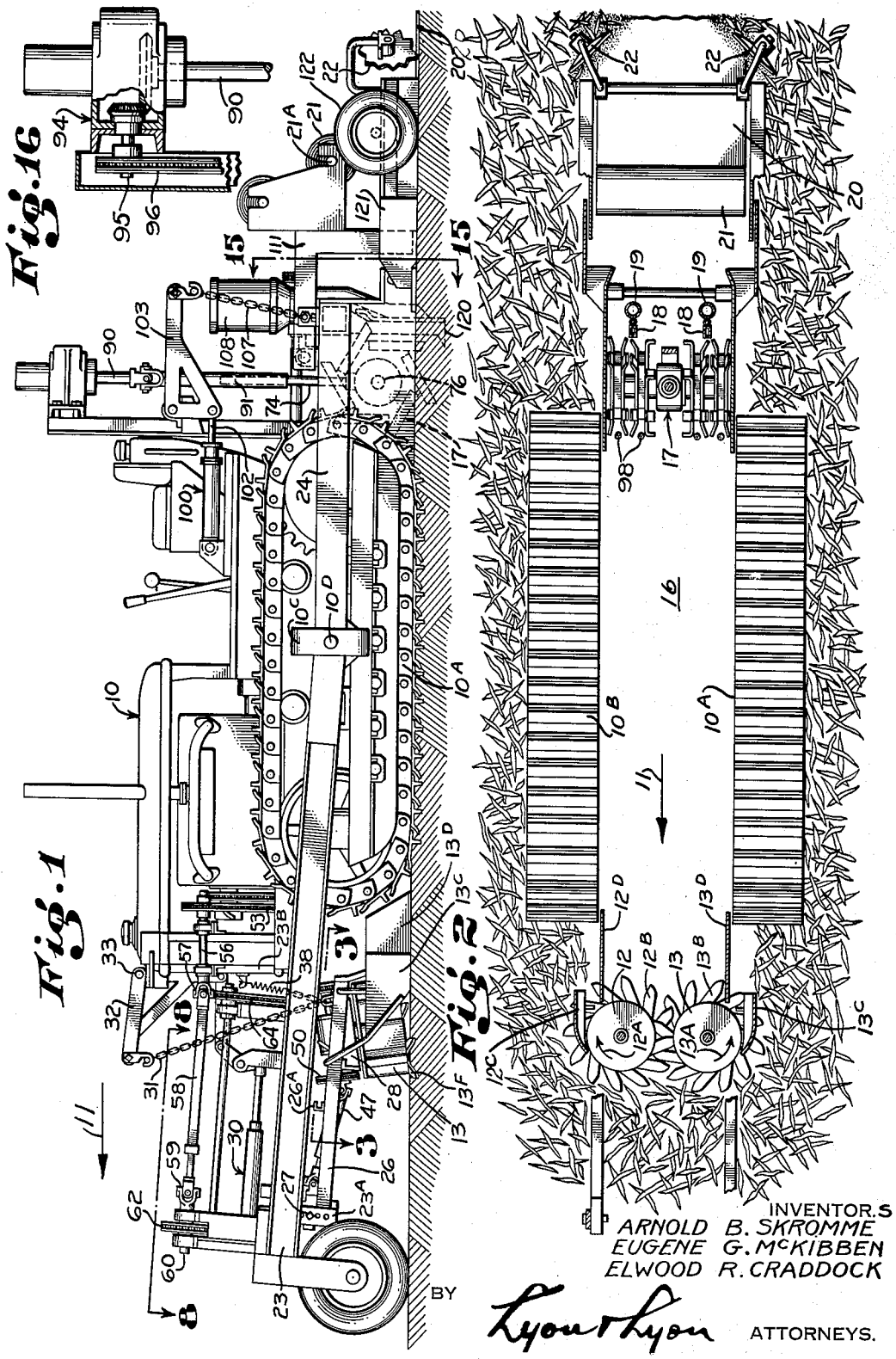
INVENTORS
ARNOLD B. SKROMME
EUGENE G. McKIBBEN
ELWOOD R. CRADDOCK
BY Lyon & Lyon
ATTORNEYS.

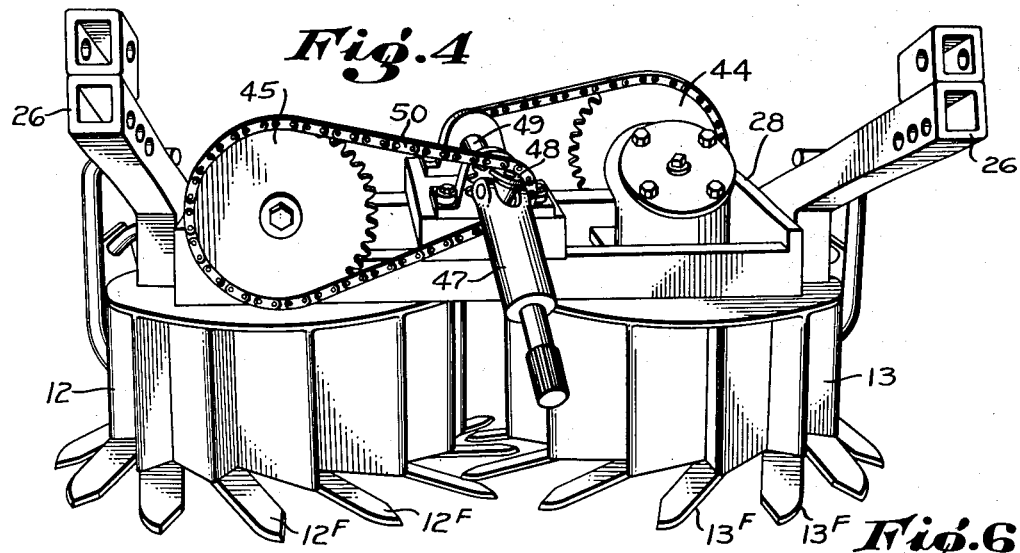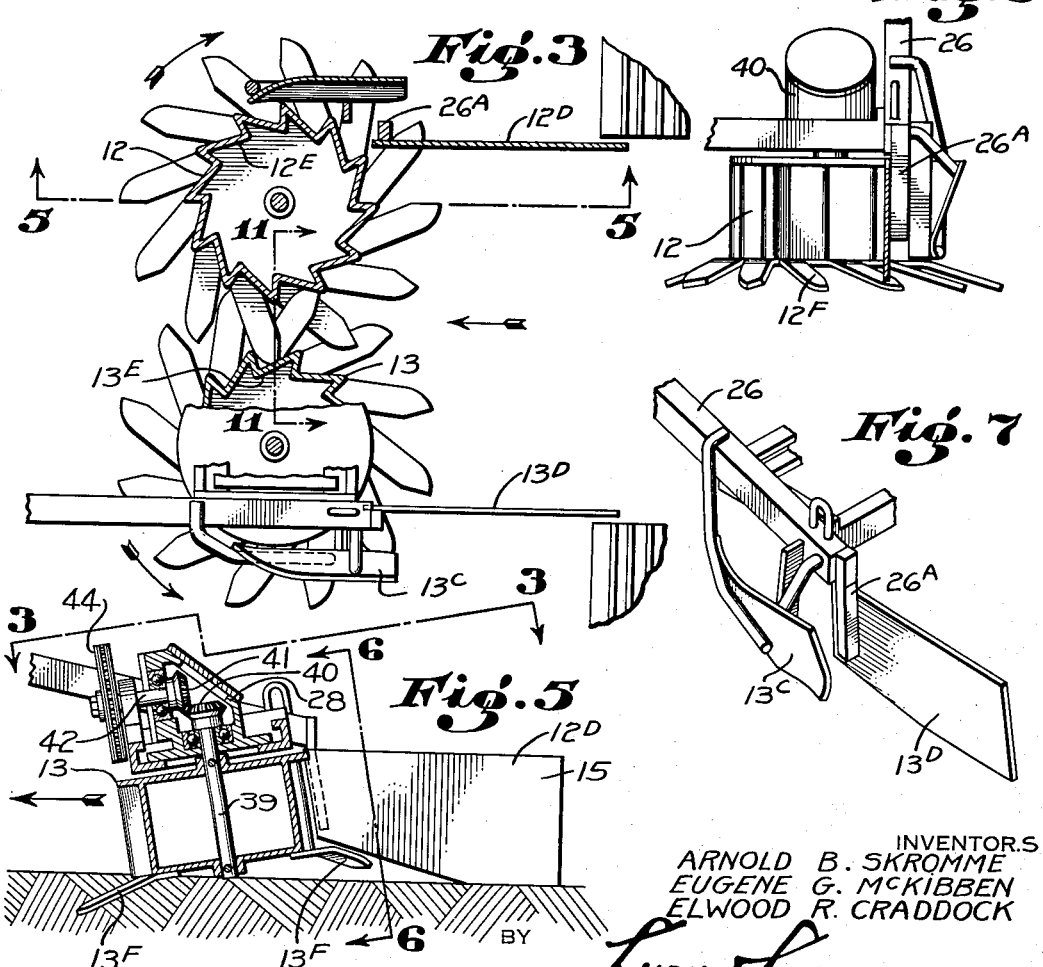

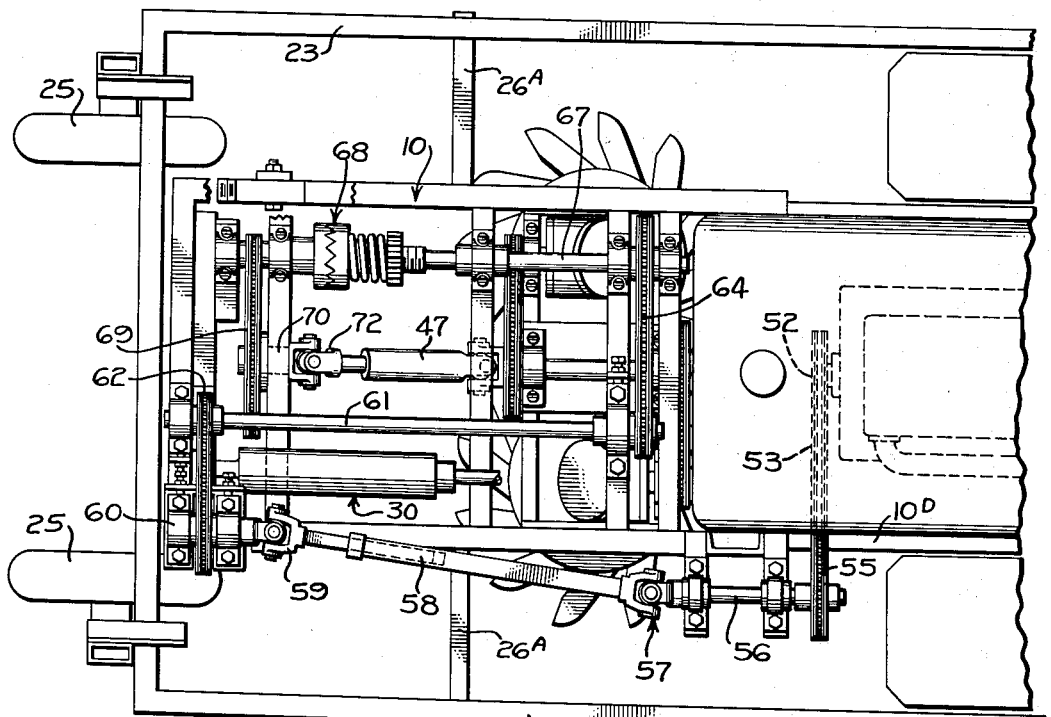
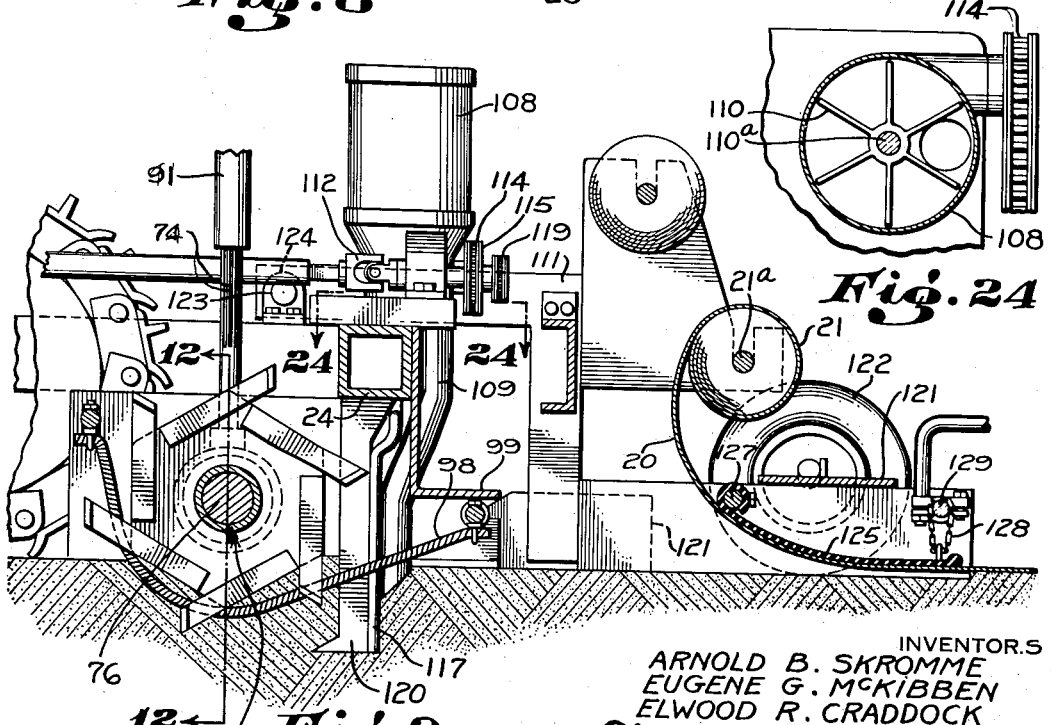

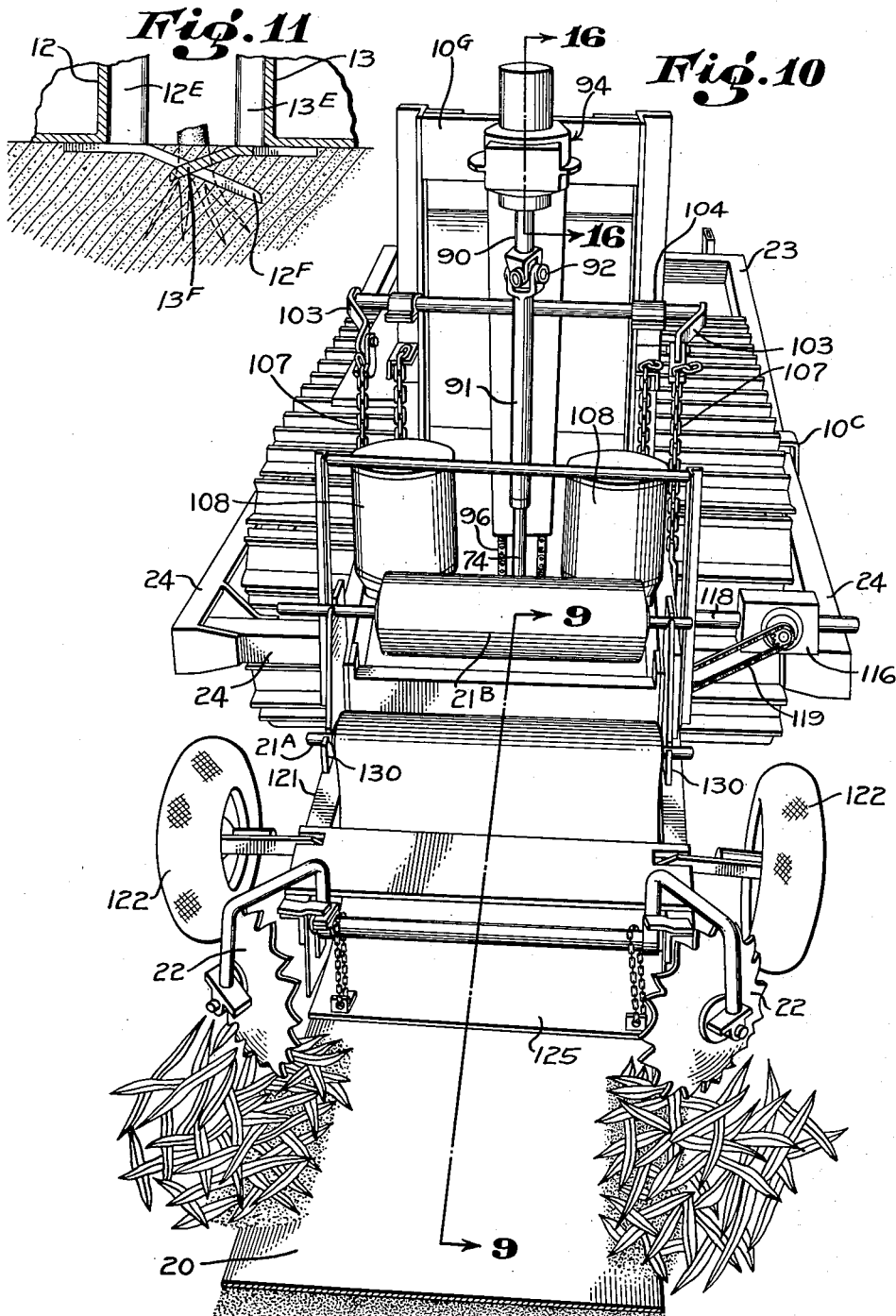

June 5, 1956   A. B. SKROMME ET AL   2,748,535
TRASH MULCH SEED BED MACHINE
Filed Oct. 25, 1951   8 Sheets-Sheet 5

INVENTORS
ARNOLD B. SKROMME
EUGENE G. McKIBBEN
ELWOOD R. CRADDOCK
BY *Lyon & Lyon*
ATTORNEYS June 5, 1956   A. B. SKROMME ET AL   2,748,535
TRASH MULCH SEED BED MACHINE
Filed Oct. 25, 1951   8 Sheets-Sheet 6
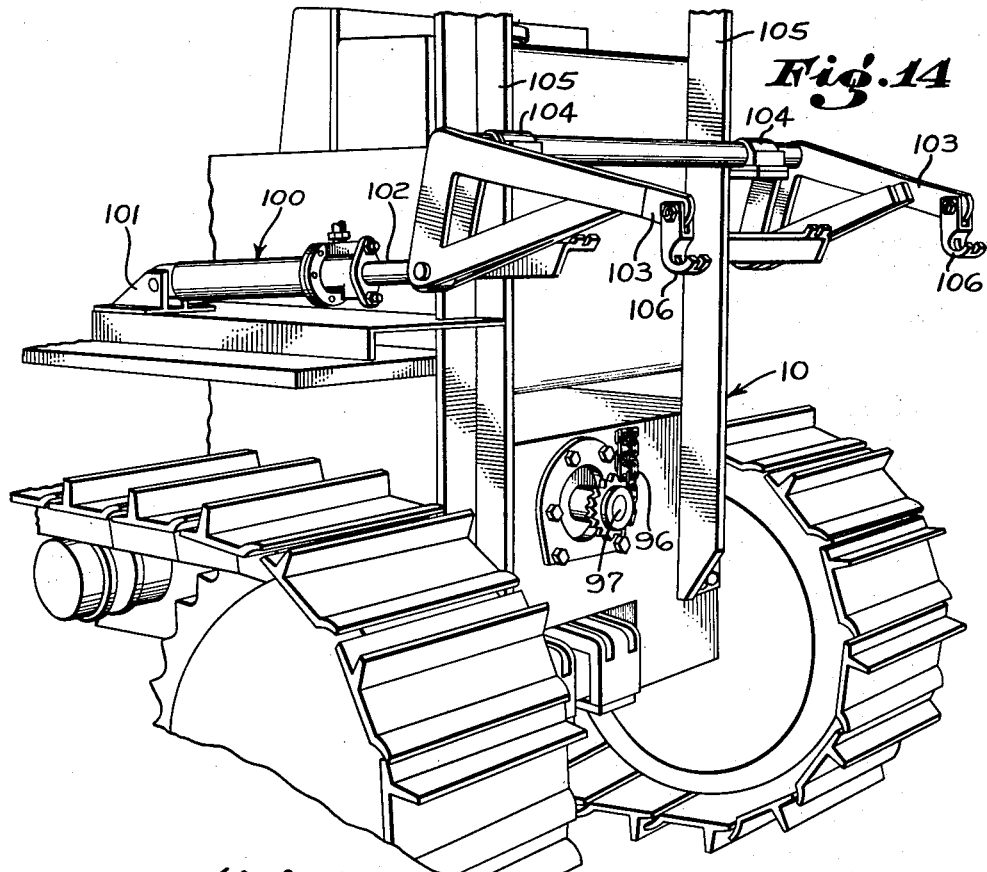
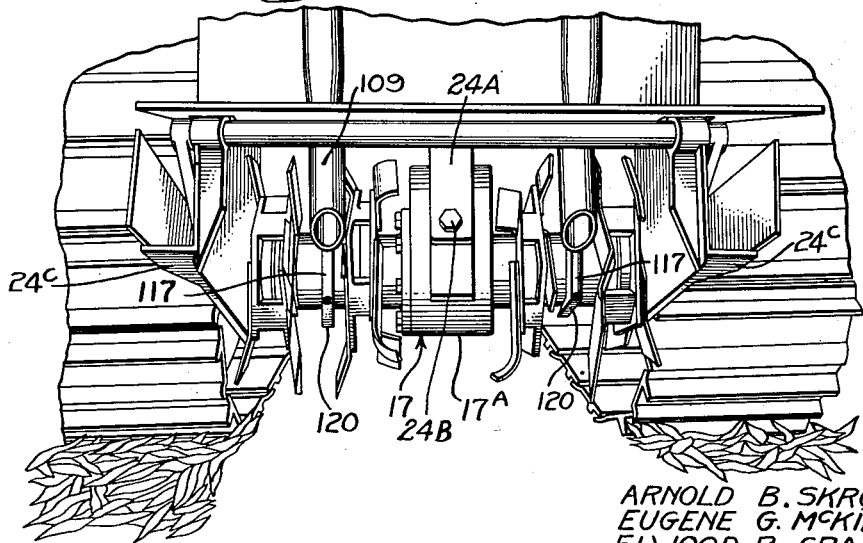
INVENTORS
ARNOLD B. SKROMME
EUGENE G. McKIBBEN
ELWOOD R. CRADDOCK
BY  *Lyon & Lyon*   ATTORNEYS.

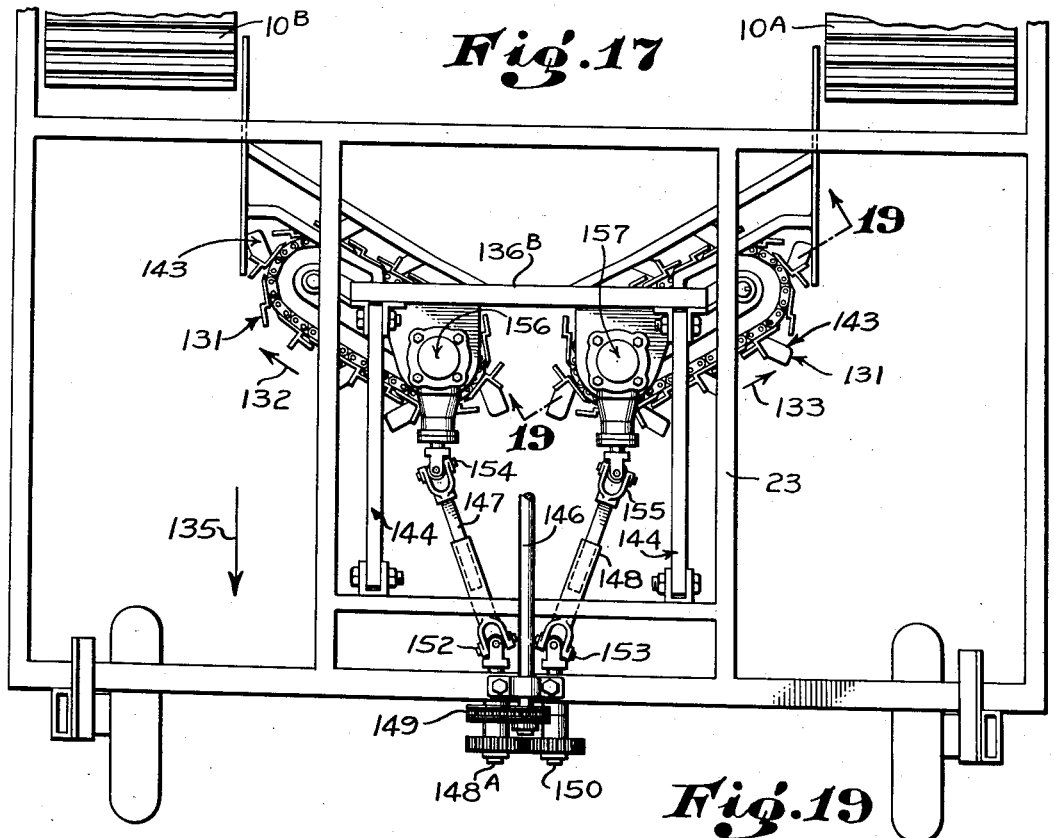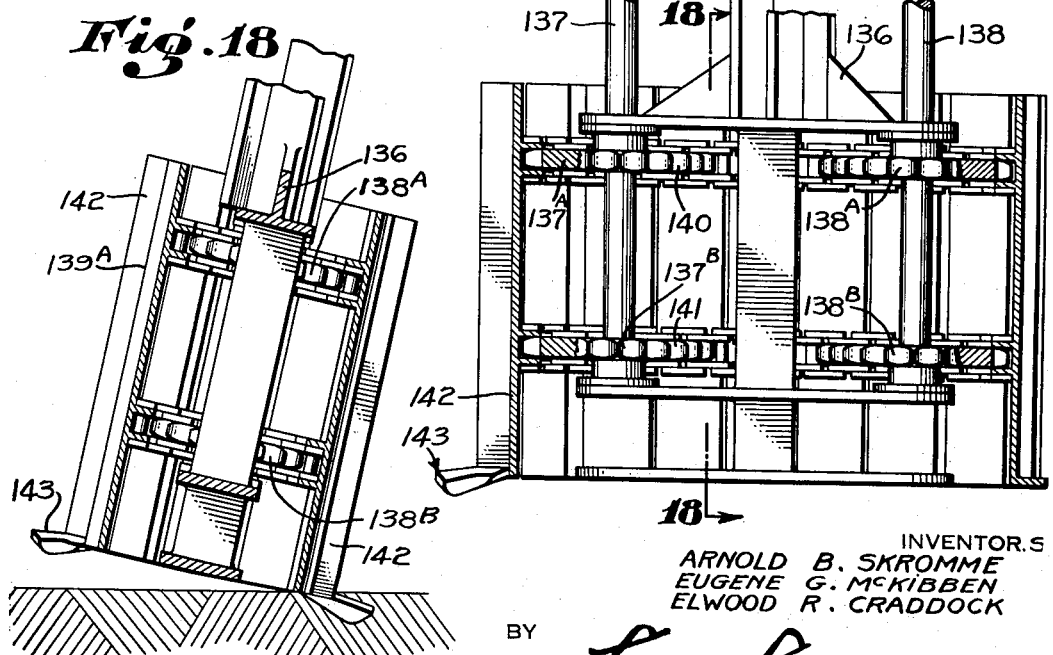

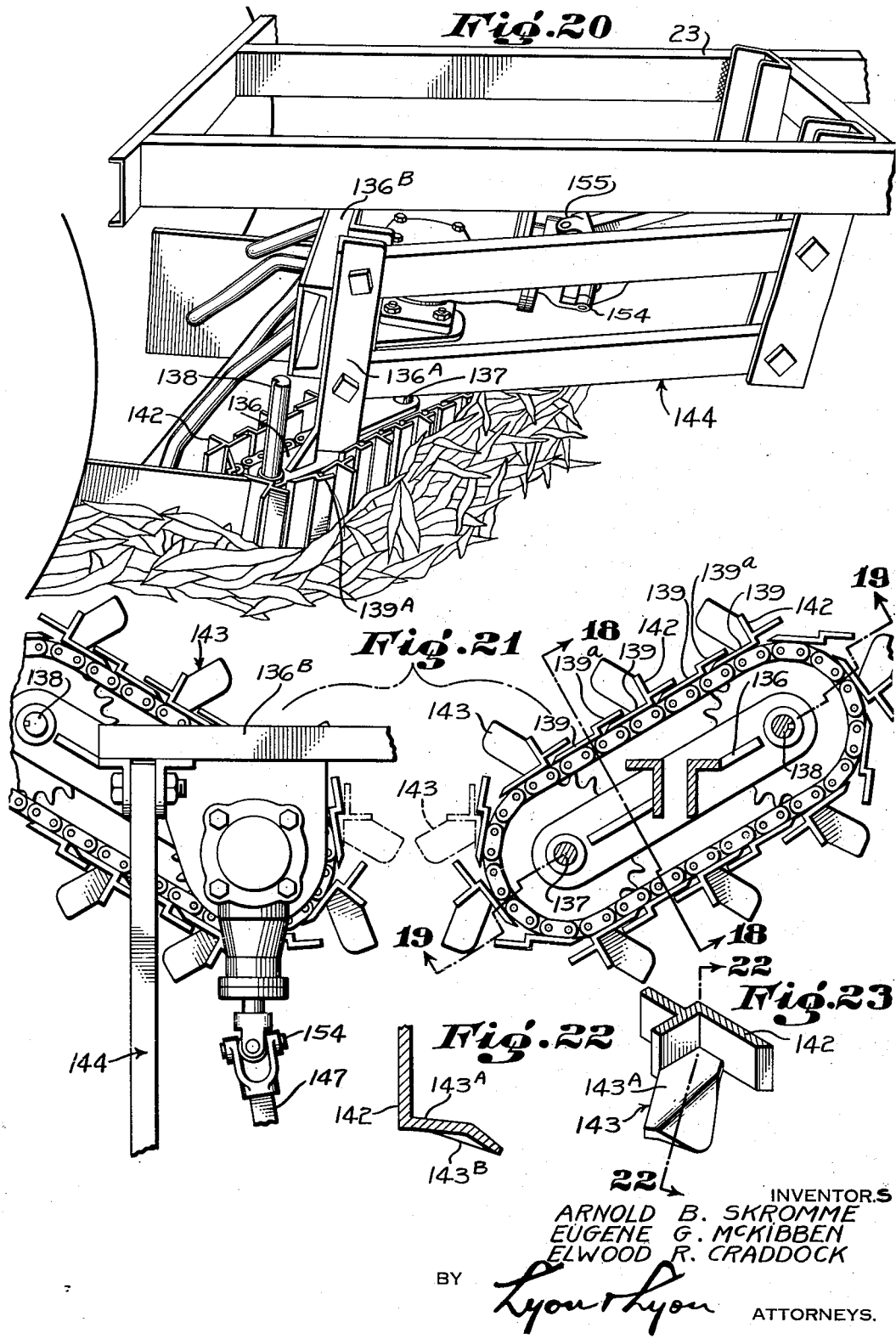

United States Patent Office 2,748,535
Patented June 5, 1956

2,748,535

TRASH MULCH SEED BED MACHINE

Arnold B. Skromme, Ottumwa, Iowa, Eugene G. McKibben, Auburn, Ala., and Elwood R. Craddock, Waipio, Territory of Hawaii, assignors to Pineapple Research Institute of Hawaii, Honolulu, Territory of Hawaii, an association of the Territory of Hawaii Application October 25, 1951, Serial No. 253,152

12 Claims. (Cl. 47—9)

The present invention relates to an improved machine which incorporates the functions of trash or crop residue moving, soil tilling, soil fumigating, fertilizer distributing and laying of mulch paper, and has been found to be particularly useful in preparing seed beds for pineapples after a previous crop has been harvested. It is understood, however, that while the invention is particularly useful in the preparation of pineapple seed beds, it is appreciated that certain features of the present invention may find utility in other fields of agriculture.

The present invention contemplates the provision of a new tractor propelled machine which is particularly useful in preparing seed beds in fields on which heavy crop residue, i. e., trash, remains after previous harvesting of pineapples.

The machine functions initially to remove the crop residue from predetermined areas, cutting some crop residue which may remain rooted, such predetermined areas being subsequently tilled, then fumigated and fertilized and paper laid over such prepared soil, with some of the soil or trash laid along edges of the paper to maintain it in place on the field.

It is therefore an object of the present invention to provide an improved machine of this type functioning to achieve the aforementioned results.

Another object of the present invention is to provide an improved machine of this type characterized by the fact that a trash moving device is placed on the front of the tractor for parting the trash, i. e., crop residue, with one half of the crop residue being moved to one side of the machine and the other half being moved to the other side of the longitudinal axis of the machine when and as it moved through the field, to obtain new advantages, and to thereby eliminate the necessity of having to move such trash moving device from side to side, as in prior art arrangements, depending upon whether the machine is going up the field or down the field.

Another object of the present invention is to provide a machine of this type which is capable of operating in a field which is covered with a heavy tonnage of, for example, 50 to 100 tons of old pineapple trash or crop residue per acre, and completely preparing a new pineapple seed bed in one operation.

Another object of the present invention is to provide a new machine of this character which functions to leave all of the crop residue on top of the ground, arranged in narrow rows between beds for new plants.

Another object of the present invention is to provide an improved machine of this character in which the crop residue is required to be moved only a relatively small distance, i. e., approximately one half the width of the machine, one half of the trash being moved to opposite sides of the machine to allow the tractor always to ride on a level plane.

Another object of the present invention is to provide an improved machine of this character in which the trash moving mechanism is balanced and symmetrical about the longitudinal axis of the machine so that such mechanism does not have to be swung around at opposite ends of travel of the tractor at each end of the field.

Another object of the present invention is to provide a machine of this type which minimizes greatly the possibility of soil erosion.

Another object of the present invention is to provide a machine of this type which allows pineapple crops to be planted within a relatively short period of time after the previously planted pineapple ratoon or crop residue is knocked down.

Another object of the present invention is to provide an improved machine of this type which serves to assure a loose, fluffy soil with little loss in moisture.

Another object of the present invention is to provide a machine of this type in which a savings in power requirements and labor is obtained.

Another object of the present invention is to provide an improved machine of this character in which some of the aforementioned functions thereof may be eliminated, depending upon weather and soil conditions.

Another object of the present invention is to provide improved soil fumigating and fertilizing apparatus associated in a novel manner with soil working apparatus such as, for example, a soil tiller, so that the fertilizer and fumigant are applied more efficiently and the loss of fertilizer and fumigant is minimized.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 is a view in side elevation of an improved machine embodying features of the present invention;

Figure 2 is a plan view of the same, partly in schematic form, for illustrating various functions of the machine;

Figure 3 is a combination sectional and elevational view taken substantially as indicated by the lines 3—3 in Figures 1 and 5;

Figure 4 is a perspective view in the direction of the front end of the crop residue moving device in Figure 1, such device functioning also to sever still rooted plants from the ground;

Figure 5 is a sectional view taken substantially on the line 5—5 of Figure 3;

Figure 6 is a view taken substantially as indicated by the lines 6—6 in Figure 5;

Figure 7 is a perspective view showing the arrangement of the inner and outer shields or guards associated with each one of the rotatable trash moving drums shown in Figure 4;

Figure 8 is a view taken substantially as indicated by the lines 8—8 of Figure 1;

Figure 9 is a view taken substantially as indicated by the lines 9—9 in Figure 10;

Figure 10 is a perspective view showing the trailing end of the machine shown in Figure 1;

Figure 11 is a view taken as indicated by the lines 11—11 in Figure 3, and serves to illustrate the manner in which plants still remaining rooted are severed by the crop residue moving mechanism;

Figure 14 is a perspective view showing a portion of the trailing end of the machine with some of the structure removed for purposes of illustrating the associated lifting mechanism and drive for the soil tiller;

Figure 15 is a perspective view taken generally in the direction indicated by the lines 15—15 in Figure 1, but with the supporting sleds moved to raised position, and serves to show generally the soil tilling mechanism, as well as the soil fumigating tubes and fertilizing tubes;

Figure 16 is a sectional view taken substantially on the line 16—16 of Figure 10;

Figure 17 is a top plan view showing the forward end of a modified machine embodying features of the present invention, Figure 17 serving to show a different type of trash mover than the one shown in Figure 1;

Figure 18 is a sectional view taken substantially as indicated by the line 18—18 in Figure 19;

Figure 19 is a sectional view taken substantially as indicated by the lines 19—19 in Figure 17;

Figure 20 is a perspective view serving to show the parallelogram type of support for the crop residue moving means shown in Figure 17;

Figure 21 shows, in enlarged form, details of the structure shown in Figure 17 and is partly diagrammatic in form;

Figure 12:
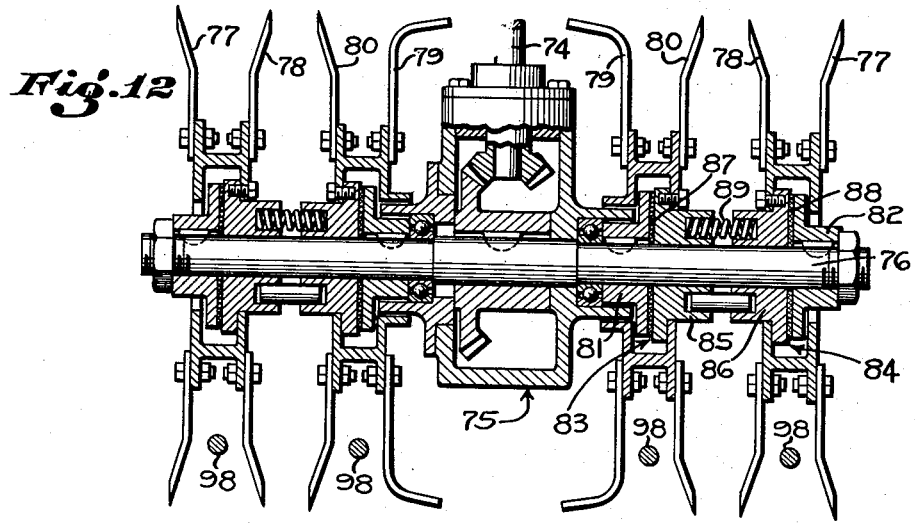
Figure 12 is a sectional view taken as indicated by the lines 12—12 in Figure 9 and shows internal structure of one of many different forms of soil tilling apparatus which may be incorporated in the present machine.

Figure 22 corresponds to a view taken substantially as indicated by the lines 22—22 of Figure 23, and serves, with Figure 23, to show details of the cutting elements associated with the trash moving device in Figure 17;

Figure 23 is a perspective view showing details of the cutting blades associated with the trash moving device in Figure 17; and Figure 24 is a sectional view through the fertilizer metering mechanism.

The various mechanisms for achieving the aforementioned results are adapted to be mounted on the chassis of a standard commercially available tractor 10 which has its forward direction of movement indicated by the arrows 11 in Figures 1 and 2. The relationship of such mechanisms with respect to the tractor treads 10A, 10B and their functioning is perhaps best illustrated in a single view in Figure 2, which is partly schematic in nature.

In Figure 2 the tractor having the treads 10A, 10B, and having a forward direction indicated by the arrow 11, has a pair of oppositely rotating power driven trash moving drums 12, 13 mounted on the forward end thereof, such drums rotating in the directions indicated respectively by the arrows 12A, 13A, and being provided with a series of self-cleaning knives 12B, 13B at their lower ends to cut and move the trash or crop residue 15 to opposite sides of the machine, leaving an area 16 cleared of such crop residue. Essentially one half of such crop residue 15 in the path of movement of the vehicle is thus moved respectively to opposite sides of the machine, where a portion of the same is run over by the treads 10A, 10B. In order to prevent any of such crop residue from entering the space between the treads 10A, 10B, i. e., the area 16, trash guards 12C, 12D and 13C, 13D are associated, respectively, with the trash drums 12, 13.

Subsequently, as the tractor moves, the soil in such area 16, i. e., between the treads 10A, 10B, is tilled by the power operated rotary tiller 17 mounted near the trailing end of the tractor, and the tilled soil is thereafter subjected to fumigant supplied through the pair of fumigant tubes 18, 18, and also to fertilizer passing downwardly through the pair of fertilizer tubes 19, 19. The soil thus tilled, fumigated and fertilized is then covered with mulch paper 20 supplied from the paper supply reel 21. A pair of rotatable soil diverting disks 22, 22 serves to cover parallel edges of the laid paper 20 with soil or crop residue to maintain the paper in place and to seal the conditioned soil under the paper 20.

All of these aforementioned operations are carried on automatically when and as the tractor 10 moves through the field.

Plant residue or trash moving mechanism comprising drums 12, 13

In general, the drums 12, 13 are rotated in opposite directions as indicated by the arrows 12A, 13A by power supplied thereto from a power takeoff shaft on the tractor, and are mounted adjustable distances above the surface of the ground, as now described in detail.

For purposes of supporting the various mechanisms, the tractor chassis has mounted on opposite sides thereof a pair of double hung brackets 10C, 10C (Figures 1 and 10) to which the forwardly extending U-shaped frame 23 (Figures 1, 8 and 10) is pivotally mounted by means of pivot pins 10D. Incidentally, the same pivot pin 10D may pivotally support a similar rearwardly extending U-shaped frame 24 upon which is mounted mechanism described later under a different heading.

The forward end of the U-shaped frame 23 thus pivotally supported is provided with axles for rotatably supporting the pair of ground engaging wheels 25, 25, so that this frame 23 may follow the contour of the ground over which it passes. This U-shaped frame 23, in turn, pivotally supports a pair of arms 26, 26 at their forward ends on a pair of pivot pins 27, 27 (Figures 1 and 13) which extend through a corresponding pair of brackets 23A, 23A (Figures 1, 4 and 13), the rearward ends of such arms 26 having affixed thereto the supporting frame 28 of the trash or crop residue moving mechanism, which includes the oppositely rotating drums 12, 13.

Figure 13:
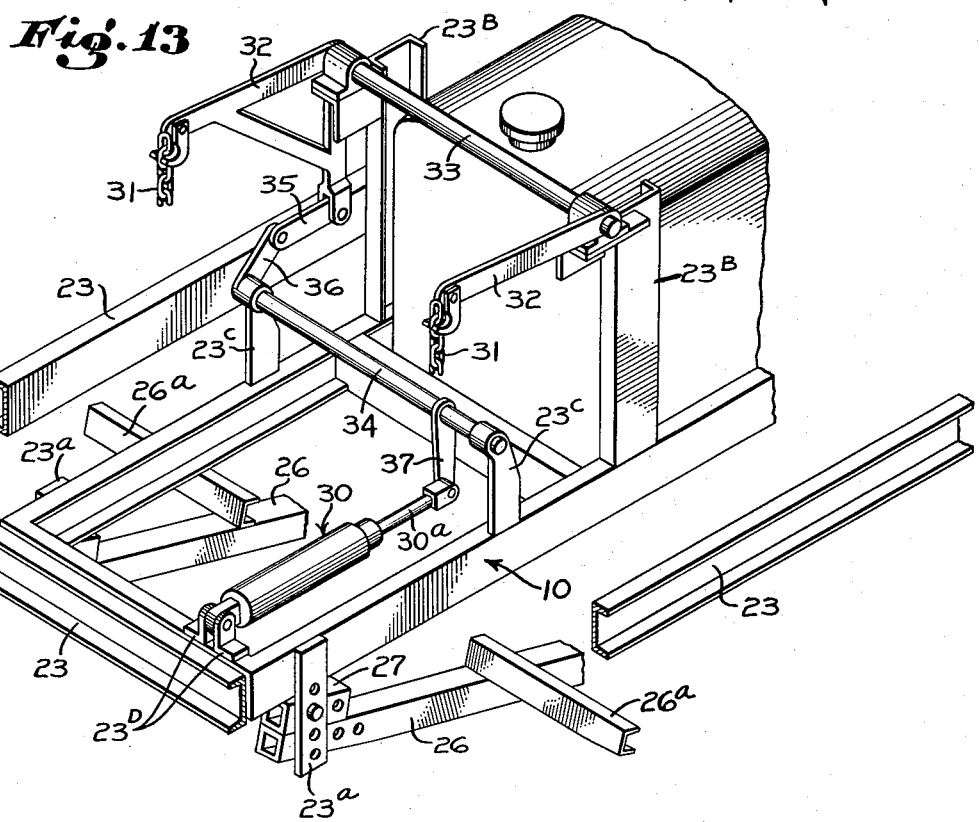
Figure 13 is a perspective view showing details of the adjustable lifting mechanism for lifting the trash moving mechanism at the front end of the machine.

The elevation of this frame 28, which mounts the rotatable drums 12, 13, may be adjusted with respect to the ground by a hydraulically operated lifting mechanism which includes the piston-cylinder assembly 30 (Figure 1), which is shown in greater detail in Figure 13. However, although this lifting mechanism which incorporates the piston-cylinder assembly 30 may be used for this purpose, it is used to lift the drums 12, 13 entirely off the ground when transporting the equipment over roads and the like where it is desired not to operate the drums 12, 13. In normal operation, the weight of the drums 12, 13 and their supporting frames is supported entirely by engagement of the drums 12, 13 with the ground, although, in those instances where such weight is excessive in relationship to field and soil conditions, a portion of such weight may be counterbalanced by a coil tension spring 38 (Figure 1) having one of its ends attached to the frame 28 and the other one of its ends attached to the upstanding bracket member 23B on the U-shaped frame member 23.

Specifically, this frame 28 is maintained in lifted position while the equipment is being transported over roads by the pair of chains 31, 31 (Figure 13), each of which has one of its ends attached to the frame 28 and the other one of its ends attached to a corresponding one of a pair of crank arms 32, 32, such crank arms being affixed to the shaft 33 which is rotatably supported on a pair of bracket members 23B, 23B extending upwardly from the frame 10. As shown in Figure 13, one of these arms 32 is interlinked with the rotatable shaft 34 by means of the link 35, which is pin connected to the crank arm 36 on shaft 34. Such shaft 34 is rotatably supported on upstanding bracket members 23C, 23C which extend upwardly from the frame 10. This shaft 34 mounts a crank arm 37 which is pivotally connected to the piston portion 30A of the piston-cylinder assembly 30, the cylinder portion of which is pivotally connected to the brackets 23D extending upwardly from the U-shaped frame 10. Thus, it is clear that upon application of different pressures to the piston-cylinder assembly 30, the position of the frame 28 supporting the drums 12, 13 may be adjusted with respect to the level of the ground over which it passes or lifted a considerable height above the ground. Also, upon lifting of the drum frame 28, bracket 26A mounted upon the frame 26 contacts frame 23 and raises it above ground with frame 28.

The drums 12, 13 are rotatably mounted on the frame 28 and, as clearly shown in Figures 3 and 4, have a reentrant surface formed by a series of contiguous longitudinally extending, generally modified V-shaped sections 12E, 13E, respectively, to impart generally a corrugated surface whereby the crop residue may be engaged and moved outwardly in the directions indicated in Figure 2.

Each of the drums 12, 13 is rotatably supported in the manner shown in Figure 5, with the axes of the drums extending generally forwardly and upwardly at an angle of about 10° from the vertical. By thus tipping these drums 12, 13 forwardly about 10°, the cutting fingers 12F, 13F mounted thereon, respectively, are permitted to clear the ground on their return strokes, i. e., when such fingers are rotated rearwardly. For this purpose the drums 12, 13 are mounted in similar fashion, and a detailed description of the mounting for the drum 13 in Figure 5 suffices as a description for the mounting of the other drum 12.

The drum 13 has affixed thereto the rotatable shaft 39, rotatably supported in the frame 28 and carrying the bevel gear 40 meshing with the bevel gear 41 on the shaft 42, which is also rotatably supported on the frame 28 to thereby provide a right angle driving connection for the drum. This shaft 42 mounts a sprocket wheel 44 for driving the drum 13, and in similar manner the drum 12 is driven by the sprocket wheel 45. Sprocket wheels 44 and 45 are driven by applying power to the shaft 47 in the manner described hereinafter, such shaft 47 being connected through universal joint 48 to the jack shaft 49, which is rotatably supported on the frame 28 and which has a pair of sprocket wheels over which chains 50, 51 pass to effect driving of the wheels 44 and 45.

The shaft 47 is powered through a train of gears and chains and slip clutch, and extensible telescoping shaft, in the manner shown in Figure 8. For this purpose, power is applied from the power takeoff shaft 52 on the tractor 10, through the chain 53 which passes over the sprocket wheel 55 mounted on the shaft 56, which is rotatably supported on the tractor chassis or frame 10D. Shaft 56 has its forward end connected through a first universal joint 57, extensible sleeve 58, and second universal joint 59 to a rotatable shaft 60 journaled for rotation on the U-shaped frame 23 which, as previously mentioned, is pivotally mounted on the chassis frame 10D whereby such pivoted frame 23 may follow the contour of the ground over which it passes. The universal joints 57, 59 and extensible sleeve 58 allow such pivotal movement of the frame 23 with respect to the tractor chassis. The shaft 60 rotatably supported on the pivoted frame 23 is coupled to the shaft 61 to drive the same by means of the chain 62, such shaft 61, as well as shaft 60, being rotatably supported on the frame 23.

Shaft 61 has its rearwardly extending end coupled through chain 64 to drive the shaft 67 which likewise is rotatably supported on the frame 23. The forward end of the shaft 67 mounts a spring biased safety overload slip clutch 68, which functions to transfer power to the chain 69 in normal operation, but functions automatically to prevent the transfer of energy in the event that, for example, the motion of the drums 12, 13 is impeded sufficiently by rocks, extra large stumps, and the like. The chain 69 thus driven through the slip clutch 68 serves to drive the shaft 70, which is rotatably supported on the frame 23, and such shaft 70 is coupled through the universal joint 72 to the jack shaft 47 for driving the drums 12, 13 in opposite directions in the manner described above.

Preferably, as shown in the drawings, each of the crop residue moving drums 12, 13 has a series of sharp, flat spring steel fingers 12F, 13F, respectively, which serve as cutting edges and which are designed to operate against the ground in the manner shown in Figure 5, to lift the trash or residue 15 which may be lying in a matted condition on the ground. Actually, in operation, these fingers 12F, 13F are required to shear off portions of stumps of the crop residue which may be securely fastened or rooted in the ground. It is observed that these fingers 12F, 13F do not extend exactly radially but have a self-cleaning sweeping angle of the order of 51°. In other words, the longitudinal axis of each finger 12F, 13F makes an angle of the order of 51° with a line extending radially outwardly from the rotational axis of the drum upon which such fingers are mounted. Further, as indicated above and shown in Figure 5, these fingers 12F, 13F do not operate flatly against the ground, since the rotational axes of the drums are tilted, and further, such fingers extend downwardly towards the ground, making an angle of the order of 15° with a plane which is perpendicular to the rotational axes of the drums.

The drums 12, 13 are rotated at a relatively slow speed so that their peripheral speed is approximately equal to the forward speed of the tractor. Thus, movement of the trash is facilitated. When, as in this instance, the peripheral speed of the drums is substantially the same as the forward speed of the tractor, the trash, as it leaves the interspace at a point substantially at right angles to the forward direction of travel, is moved backwards at the same speed the drum fingers are carried forward by the tractor, and the relative speed at this point thus is substantially zero with respect to ground and the trash has no tendency to follow the motion of the fingers around the back of the drum. It has been observed, however, that satisfactory operation may be obtained when the drums 12, 13 are rotated at a peripheral speed of from 60 per cent to 140 per cent of the ground speed of the tractor. The trash or crop residue thus parted and moved to opposite sides of the tractor by the drums 12, 13 and their associated fingers 12F, 13F, moves generally as indicated in Figure 2.

In order to prevent trash or crop residue from moving into the cleared area 16, guards 12C, 12D and 13C, 13D are provided. These guards, while shown generally in schematic form in Figure 2, are shown in structural form in Figure 7, and since the guard structures 13C, 13D are similar to the corresponding guards 12C, 12D and are mounted in similar manner, a detailed description of the guards 13C, 13D and their mounting suffices as a description of the nature and mounting of the related parts 12C, 12D.

The outer shield or guard 13C and the inner rearwardly extending guard or shield 13D are both mounted on the arms 26 and extension 26A thereof, respectively, as shown in Figure 7. The forward end of the outer shield or guard 13C, as shown in Figures 2 and 7, lies adjacent the periphery of the drum 13 and has its forward end curved inwardly, while the inner or rear shield 13D is essentially a straight metal plate, the prolonged axis of which intersects the drum 13 and extends between the spaced tractor treads 10A, 10B, all for the heretofore described purpose of preventing the debris from entering the cleared area 16, the soil within which is subsequently tilled by the rotary tiller 17.

Soil tilling mechanism 17

The U-shaped frame 24 (Figures 1 and 10), which is pivoted on a pair of spaced tractor frame brackets 10C, serves as a mounting frame for the rotary tiller 17. This U-shaped frame 24 is hung so that it may be moved independently of the previously described similar U-shaped frame 23 which extends forwardly around the forward end of the tractor.

The structure of the rotary tiller 17, per se, may be of any one of well known commercially available types and may take other forms than the one described and shown herein so long as it functions generally to break up the soil into a generally fluffy, loose mass.

Such rotary tiller 17 may be affixed to the U-shaped frame 24 in the manner shown in Figure 15, wherein the casing or housing 17A of the rotary tiller is secured to the downwardly extending bracket 24A by means of releasable bolts 24B. Such bracket 24A extends downwardly from the frame 24 (Figures 1, 9, 10 and 15) to which it is secured, as for example, by welding or the like.

Normally, in use of the equipment, the U-shaped frame 24 with the rotary tiller 17 secured thereto, has its pair of spaced skids 24C (Figure 15) engaging the ground and thus supporting the weight of the frame and the tiller 17. By providing these skids 24C, the frame 24 and rotary tiller 17 mounted thereon follow the contour of the ground over which they pass, so that the rotary tiller penetrates the ground uniform distances even though the surface of the ground may be undulatory in character.

The rotary tiller may, for example, be constructed as shown in Figure 12, wherein the power input shaft 74 entering the right angle gear box or casing 75 serves to continuously rotate the horizontally extending shaft 76. This shaft 76, rotating in the counterclockwise direction in Figure 9, serves to rotate a series of soil tilling blades in the form of modified disks 77, 78, 79 and 80 through overload safety spring biased friction clutches. It is noted in Figure 12 that the right hand side of the soil tiller is constructed in a manner similar to the left hand side, and for that reason a detailed description of the right hand side suffices as a description of the left hand side.

The shaft 76 has a pair of spaced collars 81, 82 keyed thereto. These collars 81, 82 continuously rotate and serve essentially as one element of the friction slip clutches 83, 84, respectively. The clutch plates 85, 86, forming respectively a portion of the clutches 83, 84, are pressed into engagement with the clutch lining material 87, 88, respectively, by means of the coil compression springs 89, to thereby normally establish driving connections between the shaft 76, on the one hand, and the modified disks 80, 78, on the other hand. These driving connections, however, provided by the slip clutches 83, 84, are interrupted when these disks 80, 78, or one of the same, encounters obstacles such as large rocks, large roots and the like to thereby minimize injury to the disks and overloading of the drive thereto.

The power input shaft 74 (Figures 12, 10 and 16) extends vertically upwardly and is coupled to the elevated vertical shaft 90 through an extensible sleeve connection 91 and universal joint 92. This shaft 90 is a shaft extending outwardly from the right angle gear box 94, which is mounted on an upwardly extending bracket or frame 10G supported on the chassis of the tractor 10. The other shaft 95 of the gear box 94, as shown in Figure 16, is driven by a chain 96 which extends downwardly, as shown in Figures 16, 10 and 14, around a driving sprocket on the power takeoff shaft 97 of the tractor 10.

It is preferred that cleaning means be provided on the rotary tiller to prevent the accumulation of roots and trash from building up, for example, between the disks 78, 80 to such an extent that the rotor effectively becomes a solid cylinder. Such cleaning means may comprise ¾-inch wire cables 98 (Figures 9 and 12), which lie between such disks 78 and 80 and encircle the shaft 76, with the ends of such wire cables affixed to hood 99 both forwardly and rearwardly. Such hood 99 partially covers the upper portion of the rotary tiller and serves to direct the tilled soil back to the ground after it is thrown upward by the tiller.

The U-shaped frame 24 may be raised to an elevated carrying position wherein the skids 24C no longer engage the ground, such carrying position being shown in Figure 15. The means whereby such U-shaped frame 24 and the mechanism mounted thereon may be moved to an elevated position is shown in Figure 14 and comprises essentially a pair of piston-cylinder assemblies 100 on opposite sides of the tractor, with the cylinder portion of such assembly pivoted to brackets 101 mounted on the tractor frame, and with the piston portion 102 thereof pin connected to the pair of spaced bell crank arms 103, 103, such bell crank arms being journaled for rotation in spaced bearings 104, 104 mounted on the upwardly extending bracket members 105 on the tractor frame. The free ends of such bell crank arms 103 carry pivoted chain engaging hooks 106 to which upper ends of chains 107 (Figure 10) are releasably fastened, the lower ends of such chains 107 being attached, as shown in Figure 1, to the U-shaped pivoted frame member 24, which has its forward end mounted for pivotal movement about the pivot pin 10D passing through the bracket 10C on the tractor frame. It is clear that upon application of pressure to the piston-cylinder assembly 100, the frame 24 may be raised to an elevated carrying position wherein the rotary tiller 17 is ineffective to engage and till the ground. Other mechanisms described in detail hereinafter are likewise raised upon such raising of the U-shaped frame 24.

*Fertilizer feeding mechanism*

The fertilizer feeding mechanism is mounted on the rearwardly extending U-shaped frame 24, and in general, comprises a pair of fertilizer storage hoppers 108, 108 (Figures 9 and 10) mounted on opposite sides of the machine, with a corresponding pair of discharge tubes 109, 109 (Figure 15) extending downwardly from the same, with the open ends or mouths of such tubes 109 extending below the soil line a distance of the order of 2 inches when the skids 24C rest on the ground.

The crystalline fertilizer in the hoppers 108, 108 flows by gravity, but such flow is metered in accordance with the ground speed of the machine. For this purpose the hoppers 108 may be of well known type in which the rate of discharge of the crystalline fertilizer is determined by the speed of rotation of a small paddle wheel disposed in the conduit which interconnects the hopper 108 with the discharge tube 109, as exemplified by the paddle wheel 110 in Figure 24. This paddle wheel 110 is driven by a jack shaft 111 (Figure 9) which has its forward end geared, by means not shown, to rotate at a speed proportional to the linear speed of the tractor treads. The particular means whereby such gearing is accomplished is omitted, only for purposes of minimizing the length of this description, but as it well understood, such gearing may be effected by many well known means. For example, the jack shaft 111 may have mounted thereon a worm gear which is meshed with a gear disposed on one of the axles, which serves to drive the tractor treads. The rearwardly extending end of the jack shaft 111 is coupled through the universal joint 112 to the sprocket wheel 114 rotatably mounted on the U-shaped frame 24. This sprocket wheel 114 serves to drive the chain 115 which is geared to the paddle wheel shaft 110A, to thereby effect dispensing of the crystalline fertilizer at a rate depending upon the ground speed of the tractor.

The lower ends of the fertilizer dispensing tubes 109 (Figures 9 and 15), as mentioned above, normally penetrate into the soil to effect a mixture of fertilizer in the top 2 inches of soil at the plant line.

*Soil fumigant means*

The soil fumigant means is mounted on the rearwardly extending pivoted U-shaped frame 24 in the manner shown in Figures 10, 15 and 9. In general, the soil fumigant, in liquid form, is placed in the receptacle 116 (Figure 10) and a pump therein operated in accordance with the ground speed of the tractor dispenses liquid fumigant from such receptacle 116 into the pair of fumigant tubes 117, 117 (Figures 15 and 9) through an interconnecting conduit 118 (Figure 10).

The dispensing pump in receptacle 116 is powered by the driving chain 119 which, in turn, is driven by a shaft which rotates in accordance with the ground speed of the tractor. For purposes of example, such driving chain 119 is shown in Figure 9 as being driven by the same jack shaft 111 described above.

It is understood, of course, that other means may be used to operate the liquid fumigant dispensing means, and the fertilizing dispensing means described above, in accordance with the ground speed of the vehicle, and the particular means shown herein, for that reason, are described as being exemplary of those which may be used.

It is observed, from a study of Figures 9 and 15, that the liquid soil fumigant tube 117 is carried on and rearwardly of the corresponding pair of shanks 120, 120, and that such tubes 117 extend a relatively long distance into the ground compared to the fertilizer dispensing tubes 109 which are aligned with corresponding tubes 117 along the longitudinal axis of the tractor, and with the fumigant tubes 117 being disposed forwardly of the corresponding vertical tubes 109.

The length of the shanks 120, upon which the fumigant tubes are mounted, extend approximately ½-inch deeper than the maximum penetration of the blades of the rotary tiller 17, so that the soil fumigant is placed deeply into the soil and covered thoroughly by falling soil. This feature is deemed to be important in relationship to prior art expedients of this type, since ordinary fumigation shanks leave more or less well defined cracks in the soil, as the soil in such case simply falls back to close the opening made by the shank. However, in the present instance, the shanks 120 are placed close enough to the tiller so that the soil tilled by the tiller is thrown around and behind the path of the shank 120 in such a manner that there is no actual parting of the soil by the shank 120.

*Mulch paper laying mechanism*

The mulch paper laying mechanism is mounted on a separate frame 121 (Figures 1, 10 and 9) which has a pair of ground engaging wheels 122, 122 rotatably supported thereon, and with the forward end of such frame pivotally and releasably secured to the end of the U-shaped frame 24. Such releasable pivotal connection is effected, as shown in Figure 9, by the pivot pin 123 passing through upstanding spaced bracket 124 on the frame 24. Such bracket type of mounting is preferred since, although there is a pivotal connection between the frames 24 and 121, raising of the frame 24 by operation of the aforementioned piston-cylinder assembly 100 results also in the raising of the frame 121 for transport purposes. This is so since clockwise rotation of the frame 121 is limited by its engagement with the frame 24, with the result that upon application of pressure to the piston-cylinder assembly 100, the frame 121 and its ground engaging wheels 122 are lifted above the ground.

In normal operation, of course, the ground engaging wheels 122 ride on the ground and mulch paper 20, supplied in rolls 21, is automatically laid when and as the tractor moves forwardly. The paper 20 leaves the roll 21, as shown in Figure 9, in the forward direction of movement and is held down by the rubber flap 125 of generally arcuate cross section, the forward end of such flap 125 being affixed to the stationary shaft 127 on the frame 121, and the trailing end of such flap 125 being loosely supported by the chain 128 passing over a second stationary shaft 129 on the frame 121. The pair of notched wheels or soil diverting disks 22, 22 (Figures 1 and 2) are rotatably supported on the frame 121 with their rotational axes inclined so that they automatically cause movement of the soil over the edge of the paper previously laid, to maintain the same in place and to effectively seal the conditioned soil below the paper. The paper roll 21 for this purpose is simply supported on the shaft 21A (Figures 9 and 10) supported on bifurcated upstanding bracket members 130, 130 extending upwardly from the frame 121. Such shaft 21A, of course, passes through the hollow cylindrical portion of the supply roll 21. An extra reserve paper supply reel 21B may similarly be mounted on the frame 121 as shown in Figure 10.

*Modified trash moving arrangement shown in Figures 17–23, inclusive*

Instead of using a pair of oppositely rotating drums to part the trash and to move substantially equal half portions thereof to opposite sides of the machine, the belt type conveyors shown in modified arrangements in Figures 17–23 may be substituted and used. For purposes of orientation, corresponding parts in the various figures throughout the drawings have identical reference numerals.

Referring to Figure 17, the pair of chain conveyors 131, 131 move in opposite directions as indicated by the arrows 132, 133 and serve the general function of first parting the trash, as the vehicle moves in the forward direction indicated by the arrow 135, to simultaneously move the same outwardly towards opposite sides of the tractor in the path of the tractor treads 10B, 10A. The conveyors 131 are each of substantially identical construction, and for that reason a detailed description of one suffices as a description of the other. Considering the right hand conveyor 131 in Figure 17, there is provided, as shown in Figure 19, a frame 136 upon which are rotatably mounted the spaced shafts 137, 138 which mount respectively the sprocket wheels 137A, 137B and 138A, 138B over which chains 140, 141 pass. These chains have welded to their outside periphery, as shown in Figure 21, a special configuration of steel plates and angle iron members as well as cutting elements for the intended purpose. Specifically, in fabrication, first a series of plates 139 are welded to the spaced chains 140, 141. The angle iron members 142 are welded to alternate plates 139, with one leg of such angle iron member partially overlapping the adjacent plate 139. The intermediate plates 139 have welded thereto a bridging plate 139A which serves to bridge the distance between adjacent plates. Such plates 139A are sufficiently offset to provide clearance, and are sufficiently long to provide an effective bridge between adjacent plates 139 as the conveyor chains pass around their shortest arc of travel. These angle iron pieces 142 thus serve essentially as grousers which grip the trash to carry the same outwardly.

Short steel cutting fingers 143 are welded to the lower ends of the angle iron members 142 in the manner shown in Figure 23. These steel fingers 143 usually operate under the top soil surface a distance in the order of approximately ½-inch to rip and cut out leaves and old pineapple stumps which have either been pressed into the soil by previous tractor operations or which have fallen into natural soil depressions.

The supporting frames 136 are each provided with upright supports 136A which are interconnected by the interconnecting cross beam 136B so that these two units move as a unit. The cross beam 136B, in turn, is hingedly secured by means of pivoted parallelogram frames 144, 144 to the forwardly extending U-shaped frame 23. Details of this parallelogram frame 144 are clearly shown in Figure 20. The pair of units 131 thus pivotally supported on the frame 23 are, of course, relatively heavy, and while in some instances may rest directly on the ground, in other instances a portion of their weight may be counterbalanced by the use of coil tension springs, in the manner described above in connection with the trash moving drums.

The drive for each of the conveyors 131 is effected by connecting the drive shaft 146, which is powered by a power takeoff shaft of the tractor, to the extensible shafts 147, 148. Specifically, the shaft 146, journaled for rotation on the frame 23, drives the shaft 148A through the chain 149. The shaft 148A is geared to the shaft 150, and these shafts 148A, 150 are connected, respectively, through universal points 152, 153 to the jack shafts 147, 148, which in turn are connected through universal joints 154, 155 to the input shaft of right angle gear drives 156, 157. The output shaft of these gear drives 156, 157 corresponds to the shaft 137 shown in Figure 19. Thus, rotation of the shaft 146 causes movement of the steel chain conveyors 131, 131 in the directions indicated by the arrows 132, 133.

Preferably, the conveyors 131, 131 are mounted as shown in Figure 17, so that the intersection of their longitudinal axes forms generally a V having an included angle of the order of 140°. Further, each of the conveyors are tipped forwardly in the manner shown in Figure 18, with their longitudinal axes making an angle of the order of 12° with respect to the vertical, so that while the leading cutting elements 143 penetrate into the ground, the corresponding cutting elements at the rear are disposed above the ground.

Also of importance is the shape of these cutting elements 143 which have essentially two integrally formed portions 143A, 143B; the first portion 143A (Figures 22 and 23) extends downwardly in the order of 5° with respect to the longitudinal axis of the angle iron member 142 to which it is secured. Further, the leading cutting edge on the portion 143B is inclined still further downwardly in the order of 10° with respect to the plane of the first portion 143A. By this expedient, the leading cutting edge on the portion 143B is lower than the back edge of the portion 143A. More specifically, it is noted that both portions 143A, 143B are formed essentially from a substantially rectangular piece of metal, the longitudinal axis of which intersects the apex formed by the legs of the angle iron piece 142, and with such longitudinal axis making an angle of approximately 45° with respect to the planes of the legs of such angle iron members. Further, the forward leading edge of such rectangular piece is twisted downwardly and sharpened to provide the structure shown in Figures 22 and 23.

The machine thus described, either in its original or modified form, is intended to work in a field which is covered with a heavy tonnage of, for example, 50 to 100 tons of old pineapple trash per acre, and to completely prepare a new pineapple seed bed in one operation, in contradistinction to the methods heretofore used which required four to twelve months.

This pineapple plant residue or trash consists of old pineapple stumps and leaves which have previously been cut up by large stump cutters, plows or other machines. The crop residue lies in a mat on the ground about three to four inches thick, with some of the stumps still rooted in the ground. The machine described herein functions generally to leave all of this crop residue on top of the ground but arranged in narrow rows which define the beds for new plants.

The machine functions, after moving the crop residue aside, to thoroughly and completely till the soil between such lanes of crop residue in one operation, to fumigate and fertilize the soil and to lay paper over such cleared, tilled, fumigated and fertilized soil, with some of the crop residue covering opposite edges of the paper so as to seal the prepared soil.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. A machine of the character described comprising a vehicle, said vehicle having a pair of crop residue moving means mounted on its forward end functioning to part and to move crop residue laterally to opposite sides of said vehicle in its forward movement, means mounted on said vehicle driving said moving means in opposite directions, a rotary tiller mounted centrally and rearwardly of said vehicle and functioning to work the soil cleared of crop residue by said moving means, soil fumigant tubes mounted on said vehicle and extending down into the soil rearwardly of said rotary tiller, fertilizer tubes mounted on said vehicle and extending rearwardly of said rotary tiller and of said fumigant tubes, said fertilizer tubes extending a shorter distance into the ground than said fumigant tubes, paper dispensing mechanism mounted on said vehicle rearwardly of said rotary tiller, and a pair of soil diverting means mounted on opposite sides of the vehicle and functioning to dispose crop residue and soil on opposite edges of the paper laid on the ground by said paper dispensing mechanism.

2. A machine of the character described comprising a vehicle, said vehicle having a pair of crop residue drums mounted on its forward end on opposite sides of the longitudinal axis thereof functioning to part and to move crop residue laterally to opposite sides of said vehicle in its forward movement, means mounted on said vehicle driving said drums in opposite directions, a rotary tiller mounted centrally and rearwardly of said vehicle and functioning to work the soil cleared of crop residue by said drums, soil fumigant tubes mounted on said vehicle and extending down into the soil rearwardly of said rotary tiller, fertilizer tubes mounted on said vehicle and extending rearwardly of said rotary tiller and of said fumigant tubes, said fertilizer tubes extending a shorter distance into the ground than said fumigant tubes, paper dispensing mechanism mounted on said vehicle rearwardly of said rotary tiller, and a pair of soil diverting means mounted on opposite sides of the vehicle and functioning to dispose crop residue and soil on opposite edges of the paper laid on the ground by said paper dispensing mechanism.

3. In a machine of the character described, said machine including a vehicle, said vehicle having means mounted on its forward end for parting and moving crop residue to opposite sides of the longitudinal axis of the vehicle, soil working means centrally mounted about the longitudinal axis of the vehicle and functioning to work the soil cleared by said crop residue moving means, soil fumigating and fertilizing means mounted on said vehicle rearwardly of said soil working means, paper laying means mounted on said vehicle for covering the soil worked, fumigated and fertilized, and means mounted on said vehicle functioning to cover up opposite edges of the paper to thereby provide a seal for the soil thus cleared, worked, fumigated and fertilized.

4. In a machine of the character described comprising a vehicle, said vehicle having mounted thereon symmetrically about the longitudinal axis of the vehicle, a pair of counter-rotating drums functioning to part the crop residue about the longitudinal axis of the vehicle and to move the crop residue to opposite sides of the machine, each of said drums having straight flat elongated cutting fingers with the cutting fingers on one drum intermeshing with the cutting fingers on the other drum to clear the entire area traversed by the vehicle in its forward movement.

5. The arrangement set forth in claim 4 in which said drums are provided with circumferentially disposed cutting fingers and the rotational axes of said drums are tipped forwardly of the order of 10° to permit the fingers to clear the ground as they move rearwardly of the rotational axes of said drums.

6. In a machine of the character described, said machine comprising a vehicle, a pair of oppositely moving crop residue moving drums mounted symmetrically about the longitudinal axis of said vehicle, with the rotational axes of said drums tipped forwardly in the order of 10°, each of said drums having ground engaging fingers circumferentially disposed along the lower end thereof, each of said drums having straight flat elongated cutting fingers with the cutting fingers on one drum intermeshing with the cutting fingers on the other drum to clear the entire area traversed by the vehicle in its forward movement.

7. In a machine of the character described, said machine comprising a vehicle, a first U-shaped frame extending forwardly of said vehicle and having opposite legs thereof pivotally supported on opposite sides of said vehicle, said U-shaped frame having ground engaging wheels mounted thereon whereby said frame may follow generally the contour of the ground over which it passes, a subframe pivotally supported on said U-shaped frame, a pair of oppositely moving crop residue moving drums movably supported on said subframe, said crop residue moving drums moving in opposite directions and functioning to part crop residue and to move the parted residue to opposite sides of the machine, a power takeoff shaft on said vehicle, drive means coupling said power takeoff shaft to said residue moving drums, said drums being mounted symmetrically about the longitudinal axis of said vehicle, with the rotational axes of said drums tipped forwardly in the order of 10°, each of said drums having ground engaging cutting fingers circumferentially disposed along the lower end thereof, the cutting fingers on one drum intermeshing with the cutting fingers on the other drum to clear the entire area traversed by the vehicle in its forward movement.

8. The arrangement set forth in claim 7 in which said subframe has mounted rearwardly thereof a pair of guards disposed outside of and adjacent said crop residue moving drums to prevent movement of the crop residue inwardly towards the longitudinal axis of the machine.

9. In a machine of the character described, said machine comprising a vehicle, a U-shaped frame extending around and rearwardly of said vehicle, means pivotally supporting opposite legs of said frame on opposite sides of said vehicle, the rearward end of said frame being provided with ground engaging skids whereby said frame may follow the contour of the ground over which it is pulled by said vehicle, soil working means rotatably mounted on said frame, soil fumigating and fertilizing tubes extending downwardly from said frame, said tubes being disposed rearwardly of said soil working means and with the fumigating tubes disposed forwardly of the fertilizing tubes and extending further down into the soil, a paper supporting frame articulated to said U-shaped frame and having ground engaging wheels, said paper supporting frame having a pair of soil diverting means functioning to automatically place soil along opposite edges of the paper.

10. The arrangement set forth in claim 9 in which said soil working means comprises a rotary tiller having its rotational axis extending generally horizontally, a power takeoff shaft on said vehicle, a bracket extending upwardly from the vehicle chassis, a right angle gear drive mounted on said bracket, a second right angle gear drive mounted on said U-shaped frame and serving to drive said rotary tiller, an extensible generally vertically extending jack shaft interconnecting said right angle gear drives, and means coupling the first mentioned gear drive to said power takeoff shaft.

11. In a machine of the character described, comprising a vehicle, said vehicle having mounted thereon symmetrically about the longitudinal axis of the vehicle a pair of oppositely moving endless conveyors functioning to part the crop residue about the longitudinal axis of the vehicle and to move the crop residue to opposite sides of the machine, said endless conveyors having circumferentially disposed elongated flat straight cutting fingers and the rotational axes of said endless conveyors being tipped forwardly in the order of 10° to permit the fingers to clear the ground as they move rearwardly of the rotational axes of said conveyors, the cutting fingers of one conveyor intermeshing with the cutting fingers on the other conveyor to clear the entire area traversed by the vehicle in its forward movement.

12. In a machine of the character described, said machine comprising a vehicle, soil working means mounted on said vehicle, soil fumigating means comprising a shank with a fumigant feeding tube extending downwardly into the ground, said shank and tube being mounted sufficiently close to said soil working means so that the soil drawn by said soil working means covers and obliterates the path of the shank, thus preventing leakage of the fumigant, said shank and tube extending into the soil further than said soil working means, and a fertilizing tube mounted rearwardly of said fumigant tube and extending into the soil a less distance than the fumigant tube.

References Cited in the file of this patent

UNITED STATES PATENTS

| Number | Name | Date |
|---|---|---|
| Re. 22,778 | Elliott | Aug. 13, 1946 |
| 147,992 | Soniat | Feb. 24, 1874 |
| 178,912 | Crabtree | June 20, 1876 |
| 317,802 | Laborde | May 12, 1885 |
| 402,268 | Meyer | Apr. 30, 1889 |
| 789,528 | Cook | May 9, 1905 |
| 1,021,529 | Johnson | Mar. 26, 1912 |
| 1,021,530 | Johnson | Mar. 26, 1912 |
| 1,021,929 | Hovey | Apr. 2, 1912 |
| 1,054,256 | Taylor | Feb. 25, 1913 |
| 1,082,055 | Veitl | Dec. 23, 1913 |
| 1,290,986 | Hartsough | Jan. 14, 1919 |
| 1,292,391 | Dougherty | Jan. 21, 1919 |
| 1,295,822 | Munger | Feb. 25, 1919 |
| 1,306,547 | Lyon | June 10, 1919 |
| 1,409,564 | Mitchell | Mar. 14, 1922 |
| 1,562,353 | McGuire | Nov. 17, 1925 |
| 1,725,190 | Hicks | Aug. 20, 1929 |
| 1,786,021 | Mettetal | Dec. 23, 1930 |
| 1,787,902 | Herfort | Jan. 6, 1931 |
| 2,187,833 | Lock | Jan. 23, 1940 |
| 2,319,255 | Norton | May 18, 1943 |
| 2,344,663 | Wood | Mar. 21, 1944 |
| 2,361,798 | Smith | Oct. 31, 1944 |
| 2,448,265 | Kagy | Aug. 31, 1948 |
| 2,509,627 | Bickerton | May 30, 1950 |
| 2,509,691 | McLemore | May 30, 1950 |
| 2,514,890 | McLemore | July 11, 1950 |
| 2,515,268 | Seaman | July 18, 1950 |
| 2,524,871 | Andrus | Oct. 10, 1950 |
| 2,556,072 | Dewey | June 5, 1951 |
| 2,569,464 | Edwards | Oct. 2, 1951 |
| 2,575,223 | Madill | Nov. 13, 1951 |
| 2,576,886 | McCoy | Nov. 27, 1951 |
| 2,577,363 | Poynor | Dec. 4, 1951 |
| 2,669,067 | Severance | Feb. 16, 1954 |

FOREIGN PATENTS

| Number | Country | Date |
|---|---|---|
| 66,436 | Germany | Dec. 23, 1892 |